(12) United States Patent
Yeh et al.

(10) Patent No.: US 12,547,347 B2
(45) Date of Patent: Feb. 10, 2026

(54) CONTROL CHIP AND EVALUATION BOARD

(71) Applicant: Nuvoton Technology Corporation, Hsinchu Science Park (TW)

(72) Inventors: Min-Ying Yeh, New Taipei (TW); Tzu-Lan Shen, Taoyuan (TW)

(73) Assignee: NUVOTON TECHNOLOGY CORPORATION, Hsinchu Science Park (TW)

( * ) Notice: Subject to any disclaimer, the term of this patent is extended or adjusted under 35 U.S.C. 154(b) by 0 days.

(21) Appl. No.: 18/776,842

(22) Filed: Jul. 18, 2024

(65) Prior Publication Data

US 2025/0053339 A1    Feb. 13, 2025

(30) Foreign Application Priority Data

Aug. 9, 2023  (TW) .............................. 112129937

(51) Int. Cl.
   *G06F 3/06*  (2006.01)
(52) U.S. Cl.
   CPC .......... *G06F 3/0659* (2013.01); *G06F 3/0604* (2013.01); *G06F 3/0679* (2013.01)
(58) Field of Classification Search
   CPC .... G06F 3/0659; G06F 3/0604; G06F 3/0679; G06F 3/0644; G06F 3/0611; G06F 3/0683; G11C 11/005
   See application file for complete search history.

(56) References Cited

U.S. PATENT DOCUMENTS

| | | | |
|---|---|---|---|
| 10,951,875 B2* | 3/2021 | Wetzstein | G06N 3/0455 |
| 11,531,868 B1* | 12/2022 | Duong | G06N 3/048 |
| 12,316,319 B1* | 5/2025 | Mathuriya | H01L 23/5223 |
| 2012/0051591 A1* | 3/2012 | Natori | G06V 40/161 |
| | | | 382/103 |

(Continued)

FOREIGN PATENT DOCUMENTS

| | | |
|---|---|---|
| TW | 200847123 A | 12/2008 |
| TW | 202014876 A | 4/2020 |

OTHER PUBLICATIONS

TW Office Action dated Jan. 3, 2024 issued in corresponding Taiwan Application No. 112129937, 7 pages.

*Primary Examiner* — Ramon A. Mercado
(74) *Attorney, Agent, or Firm* — MUNCY, GEISSLER, OLDS & LOWE, P.C.

(57) ABSTRACT

A control chip coupled to a sensing circuit and including a first memory, an accessing circuit, a second memory, and a processing circuit is provided. The first memory includes a first storage area and a second storage area. The first storage area stores sensing data provided by the sensing circuit. The second storage area stores processing parameters. The accessing circuit reads continuous data of the first storage area according to a first access command to generate first read data and reads at least one processing parameter of the second storage area according to a second access command to generate second read data. The second memory stores the first and second read data. The processing circuit reads the second memory and processes the first read data according to the second read data to generate first processed data. The processing circuit stores the first processed data in the second memory.

20 Claims, 2 Drawing Sheets

(56) References Cited

U.S. PATENT DOCUMENTS

| | | | |
|---|---|---|---|
| 2013/0070311 A1* | 3/2013 | Gyobu | H04N 1/2034 |
| | | | 358/474 |
| 2015/0220282 A1* | 8/2015 | Tsuda | G06F 3/065 |
| | | | 711/114 |
| 2017/0115880 A1* | 4/2017 | Chang | G06F 3/0659 |
| 2018/0300601 A1* | 10/2018 | Cedola | G06F 1/3275 |
| 2018/0314940 A1* | 11/2018 | Kundu | G06N 3/08 |
| 2019/0187963 A1* | 6/2019 | Bokhari | G06F 8/443 |
| 2019/0391865 A1* | 12/2019 | Cadloni | G11C 11/5642 |
| 2021/0209018 A1* | 7/2021 | Yu | G06F 12/0623 |
| 2022/0067536 A1* | 3/2022 | Datla | G06F 13/1689 |
| 2022/0180176 A1* | 6/2022 | Nisbet | G06F 12/0855 |
| 2025/0053339 A1* | 2/2025 | Yeh | G06F 3/0679 |

\* cited by examiner

CONTROL CHIP AND EVALUATION BOARD

CROSS REFERENCE TO RELATED APPLICATIONS

This application claims priority of Taiwan Patent Application No. 112129937, filed on Aug. 9, 2023, the entirety of which is incorporated by reference herein.

BACKGROUND OF THE INVENTION

Field of the Invention

The present invention relates to a control chip, and, in particular, to a control chip that processes continuous data.

Description of the Related Art

Generally, computer memory is divided into volatile memory and non-volatile memory. Examples of non-volatile memory comprise read-only memory (ROM), programmable read-only memory (PROM), erasable programmable read-only memory (EPROM) and flash memory. Examples of volatile memory comprise dynamic random access memory (DRAM) and static random access memory (SRAM).

The memory usually outputs corresponding data according to a specified address. However, if the memory frequently reads data between different specified addresses, the memory takes a long time to output data.

BRIEF SUMMARY OF THE INVENTION

In accordance with an embodiment of the disclosure, a control chip is coupled to a sensing circuit and comprises a first memory, an accessing circuit, a second memory, and a processing circuit. The first memory comprises a first storage area and a second storage area. The first storage area is configured to store sensing data provided by the sensing circuit. The second storage area is configured to store a plurality of first processing parameters. The accessing circuit reads continuous data stored in the first storage area according to a first access command to generate first read data and reads at least one first processing parameter stored in the second storage area according to a second access command to generate second read data. The second memory stores the first read data and the second read data. The processing circuit reads the second memory and processes the first read data according to the second read data to generate first processed data. The processing circuit stores the first processed data in the second memory.

In accordance with another embodiment of the disclosure, an evaluation board comprises a sensing circuit, a first memory, an accessing circuit, a second memory, and a processing circuit. The sensing circuit senses an environmental feature to generate sensing data. The first memory comprises a first storage area and a second storage area. The first storage area is configured to store the sensing data. The second storage area is configured to store a plurality of first processing parameters. The accessing circuit reads continuous data stored in the first storage area according to a first access command to generate first read data and reads at least one first processing parameter stored in the second storage area according to a second access command to generate second read data. The second memory stores the first read data and the second read data. The processing circuit reads the second memory and processes the first read data according to the second read data to generate first processed data. The processing circuit stores the first processed data to the second memory.

BRIEF DESCRIPTION OF THE DRAWINGS

The present invention can be more fully understood by reading the subsequent detailed description and examples with references made to the accompanying drawings, wherein.

DETAILED DESCRIPTION OF THE INVENTION

Figure 1:
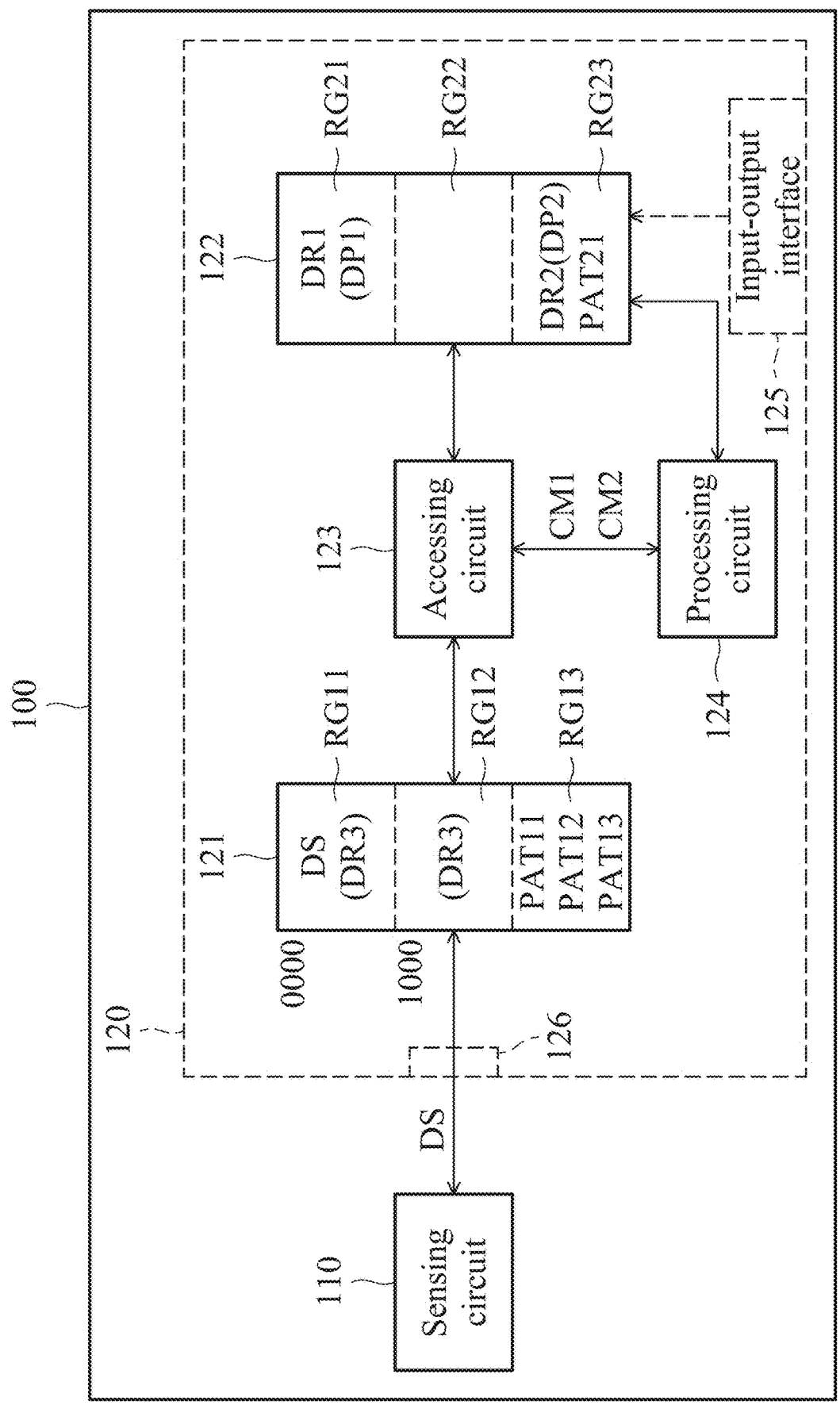
FIG. 1 is a schematic diagram of an exemplary embodiment of an evaluation board according to various aspects of the present disclosure.

The present invention will be described with respect to particular embodiments and with reference to certain drawings, but the invention is not limited thereto and is only limited by the claims. The drawings described are only schematic and are non-limiting. In the drawings, the size of some of the elements may be exaggerated for illustrative purposes and not drawn to scale. The dimensions and the relative dimensions do not correspond to actual dimensions in the practice of the invention.

FIG. 1 is a schematic diagram of an exemplary embodiment of an evaluation board according to various aspects of the present disclosure. The evaluation board 100 comprises a sensing circuit 110 and a control chip 120. The sensing circuit 110 senses an environmental feature to generate sensing data DS. In one embodiment, the sensing data DS is serial data. The kin of sensing circuit 110 is not limited in the present disclosure. In one embodiment, the sensing circuit 110 is a temperature sensor or a voice sensor. In another embodiment, the sensing circuit 110 is an image sensor, such as a complementary metal-oxide semiconductor (CMOS) image sensor. In this case, the sensing data DS is an image signal which comprising a plurality of pixel data.

The control chip 120 is coupled to the sensing circuit 110 to receive the sensing data DS. In this embodiment, the control chip 120 comprises memories 121 and 122, an accessing circuit 123 and a processing circuit 124. The memory 121 comprises storage areas RG11~RG13. Each of the storage areas RG11~RG13 comprises a plurality of memory cells. The number of storage areas is not limited in the present disclosure. In other embodiments, the memory 121 comprises more or fewer storage areas.

In this embodiment, the storage area RG11 is configured to store the sensing data DS. The storage area RG13 is configured to store processing parameters PAT11~PAT13. In some embodiments, when the sensing data DS is an image signal, the sensing data DS comprises a plurality of pixel data. The pixel data is continuous data, but it is not continuous with the processing parameters PAT11~PAT13. In this case, the processing parameters PAT11~PAT13 may be continuous data or discontinuous data. The kind of memory 121 is not limited in the present disclosure. In one embodiment, the memory 121 is a volatile memory. For example, the memory 121 is a HyperRAM.

In other embodiments, the control chip 120 further comprises a capture interface 126. The capture interface 126 writes the sensing data DS of the sensing circuit 110 to the storage area RG11. In one embodiment, the capture interface 126 comprises at least one storage capacitor (CCAP) to store the sensing data DS from the sensing circuit 110. In some embodiment, when the sensing circuit 110 is an image sensing circuit, the capture interface 126 is an image capture interface to receive the image signal sensed by the image sensing circuit.

The memory 122 comprises storage areas RG21~RG23. The number of storage areas is not limited in the present disclosure. In other embodiments, the memory 122 comprises more or fewer storage areas. In some embodiments, the capacity of the memory 122 is smaller than the capacity of the memory 121. The kind of memory 122 is not limited in the present disclosure. In one embodiment, the memory 122 is a volatile memory. For example, the memory 122 is a static random-access memory (SRAM).

THE accessing circuit 123 captures data stored in a first storage area and a second storage area of the memory 121 and then stores the captured data in the memory 122. In one embodiment, the accessing circuit 123 reads continuous data from a first start address of the first storage area and reads at least one processing parameter from a second start address of the second storage area. The invention does not limit how the accessing circuit 123 accesses the memory 121. In one embodiment, the accessing circuit 123 utilizes a direct memory access (DAM) technology to access the memories 121 and 122.

In one embodiment, the accessing circuit 123 reads the continuous data stored in the storage area RG11 according to an access command CM1 to generate read data DR1. In this case, the accessing circuit 123 stores the read data DR1 to the storage area RG21. Additionally, the accessing circuit 123 reads at least one processing parameter (e.g., PAT11) stored in the storage area RG12 according to the access command CM2 to generate read data DR2. In this case, the accessing circuit 123 stores the read data DR2 to the storage area RG23.

The processing circuit 124 reads the memory 122 and processes the read data DR1 according to the read data DR2 to generate processed data DP1. The present disclosure does not limit how the processing circuit 124 processes the read data DR1. In one embodiment, the processing circuit 124 performs a sharpness processing, an image enhancement processing, a compression processing, or a data format conversion processing for the read data DR1 according to the read data DR2. In some embodiment, the processing circuit 124 is a CPU.

The processing circuit 124 stores the processed data DP1 to the memory 122. In one embodiment, the processing circuit 124 writes the processed data DP1 to the storage area RG2 to replace the processed data DP1. In some embodiments, the processing circuit 124 provides the access commands CM1 and CM2 to direct the accessing circuit 123 to access the memory 121.

The accessing circuit 123 reads the processed data DP1 stored in the storage area RG21 of the memory 122 to generate read data DR3. The accessing circuit 123 stores the read data DR3 to the memory 121. In one embodiment, the accessing circuit 123 writes the read data DR3 to the storage area RG11 to replace a portion of the sensing data DS. In another embodiment, the accessing circuit 123 stores the read data DR3 to the storage area RG12. In this case, the memory 121 stores un-processed data (i.e., the sensing data DS) and processed data (i.e., the read data DR3). Therefore, the processing circuit 124 obtains the variation in the data stored in the memory according to the un-processed data and the processed data.

For example, the address 0000 is a start address of the storage area RG11 of the memory 121 and the address 1000 is a start address of the storage area RG12 of the memory 121. Assume that the sensing data DS is image data and the image data comprises W×H pixel data. In this case, the accessing circuit 123 reads the pixels data H times and reads W pieces of pixel data each time. After the accessing circuit 123 stores W pieces of pixel data to the memory 122, the processing circuit 124 processes the W pieces of pixel data stored in the memory 122 and stores the processed result back into the memory 122. After the processing circuit 124 processes the pixel data by H times, the memory 122 stores H pieces of processed data DP1. The accessing circuit 123 reads the W×H processed data stored in the memory 122 to generate the read data DR3. The accessing circuit 123 stores the read data DR3 back into the memory 121. The accessing circuit 123 may store the read data DR3 from the address 0000. In this case, the read data DR3 covers the sensing data DS stored in the memory 121. In another embodiment, the accessing circuit 123 stores the read data DR3 from the address 1000. Therefore, the processing circuit 124 checks the difference before and after the sensing data DS is processed from the addresses 0000 and 1000.

In other embodiments, the processing circuit 124 adjusts the read data DR2 stored in the storage area RG23 of the memory 122 to generate the processed data DP2. The processing circuit 124 stores the processed data DP2 into the storage area RG23 to replace the read data DR2. In this case, the processing circuit 124 processes the read data DR1 according to the processed data DP2.

In some embodiment, the control chip 120 further comprises an input-output interface 125. The input-output interface 125 is configured to receive a processing parameter PAT21. In this case, the processing parameter PAT21 is stored in the storage area RG23. The processing parameter PAT21 may replace the read data DR2. In another embodiment, the processing circuit 124 processes the read data DR1 according to the processing parameter PAT21 and stores the processed result (i.e., the processed data DP1) to the storage area RG21. In this case, the accessing circuit 123 writes the processed result (i.e., the processed data DP1) into the storage area RG11.

In other embodiments, the processing circuit 124 processes the same data stored in the storage area RG21 according to different processing parameters stored in the storage area RG23. In another embodiment, the processing circuit 124 processes different data stored in the storage area RG21 according to the different processing parameters stored in the storage area RG23.

In some embodiments, the accessing circuit 123 first writes at least one of the processing parameters PAT11~PAT13 to the storage area RG23. Then, the accessing circuit 123 only needs to specify a start address to read the continuous data in the storage area RG11. Since the accessing circuit 123 is not required to specify a short range of read addresses multiple times, the time it takes the accessing circuit 123 to read data can be reduced. Additionally, the accessing circuit 123 writes the read data DR3 to the memory 121 without the assistance of the processing circuit 124. Therefore, the processing circuit 124 can perform other operations to increase the efficiency of the control chip 120.

Figure 2:
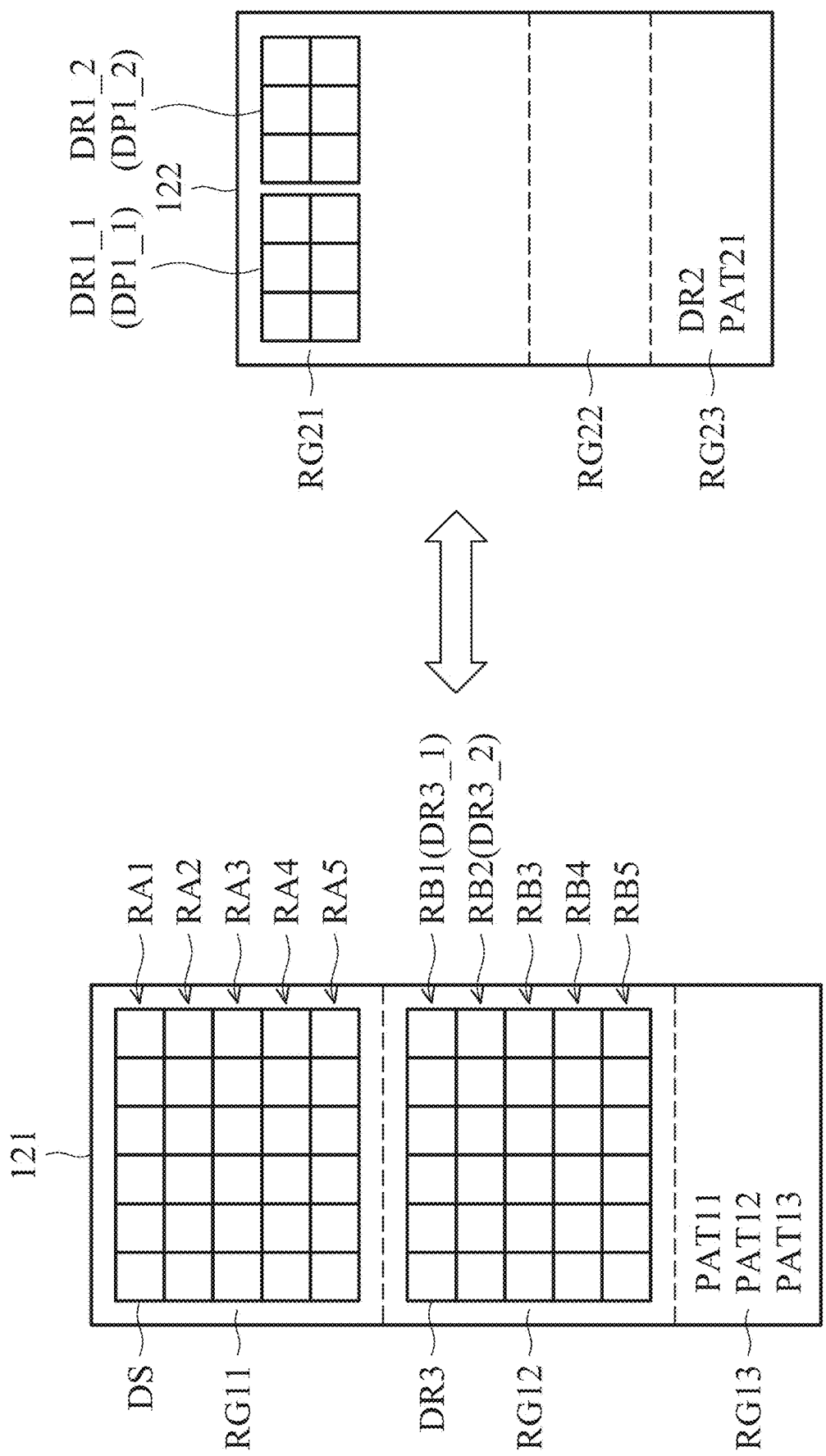
FIG. 2 is a schematic diagram of an exemplary embodiment of the internal data stored in a memory in accordance with an embodiment of the present disclosure.

FIG. 2 is a schematic diagram of an exemplary embodiment of the internal data stored in the memories 121 and 122 in accordance with an embodiment of the present disclosure. The memory 121 comprises storage areas RG11~RG13. The storage area RG11 stores the sensing data DS. The sensing data DS comprises row data RA1~RA5, The row data RA1~RA5 are stored in the storage area RG11 in sequence.

The storage area RG12 stores the read data DR3. In this embodiment, the read data DR3 comprises row data RB1~RB5. The row data RB1~RB5 are stored in the storage area RG12 in sequence. In one embodiment, the amount of read data DR3 is the same as the amount of sensing data DS. For example, the amount of read data DR3 and sensing data DS may be 640×480.

The storage area RG13 stores the processing parameters PAT11~PAT13. In one embodiment, the processing parameters PAT11~PAT13 are continuous data or discontinuous data. In another embodiment, since the storage area stored the sensing data DS is different from the storage area stored the processing parameters PAT11~PAT13, the sensing data DS is not continuous with the processing parameters PAT11~PAT13. In this case, the accessing circuit 123 needs two start addresses to read the data stored in two storage areas, such as the storage areas RG11 and RG12.

The memory 122 comprises storage areas RG21~RG23. The storage area RG21 stores the continuous data of the storage area RG11. For example, the accessing circuit 123 reads the row data RA1 stored in the storage area RG11, uses the read result as the read data DR1_1, and stores the read data DR_1 to the storage area RG21 of the memory 122. In this case, the read data DR1_1 is the row data RA1. In some embodiments, the accessing circuit 123 reads the row data RA2 stored in the storage area RG11, uses the read result as the read data DR1_2, and stores the read data DR1_2 to the storage area RG 21.

The processing circuit 124 processes the data stored in the storage area RG21 and stores the processed result in the storage area RG2 to replace the read data DR1_1 and DR1_2. In another embodiment, the processing circuit 124 stores the processed result in the storage area RG22.

The storage area RG23 stores at least one processing parameter. In one embodiment, the processing parameter stored in the storage area RG23 is the same as the processing parameter stored in the storage area RG13. For example, the accessing circuit 123 reads the processing parameter PAT11 stored in the storage area RG13 to generate the read data DR2. The accessing circuit 123 stores the read data DR2 to the storage area RG23. In this case, the read data DR2 is the same as the processing parameter PAT11. In other embodiments, the storage area RG13 further stores the processing parameter PAT21. In this case, the processing parameter PAT21 is provided from an input-output interface.

The processing circuit 124 processes the read data DR1_1 and DR1_2 according to the read data DR2 to generate the processed data DP1_1 and DP1_2. The processing circuit 124 may writes the processed data DP1_1 and DP1_2 to the processing circuit 12421 to replace the read data DR1_1 and DR1_2. In another embodiment, the processing circuit 124 writes the processed data DP1_1 and DP1_2 to the storage area RG22.

The accessing circuit 123 reads the processed data DP1_1 and DP1_2 of the storage area RG21 to generate the read data DR3_1 and DR3_2. The accessing circuit 123 writes the read data DR3_1 and DR3_2 to the storage area RG12. In this case, the read data DR3_1 is provided as the row data RB1, and the read data DR3_2 is provided as the row data RB2.

The size of storage area RG21 is not limited in the present disclosure. In one embodiment, the size of storage area RG21 is the same as the size of storage area RG11. In this case, the accessing circuit 123 reads the row data RA1~RA5 in sequence and writes the read results in the storage area RG21 in sequence. In another embodiment, the size of storage area RG21 is smaller than the size of storage area RG11. In this case, the accessing circuit 123 reads the row data RA1 and writes the read result in the storage area RG21. After the processing circuit 124 completes processing of the data stored in the storage area RG21, the accessing circuit 123 stores the processed result back into the memory 121 and then reads another row data (e.g., RA2) until the processing circuit 124 completes processing of the row data RA1~RA5.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein. It will be understood that although the terms "first," "second," etc. may be used herein to describe various elements, these elements should not be limited by these terms. These terms are only used to distinguish one element from another. In the following claims, the terms "first," "second," etc. are used merely as labels, and are not intended to impose numerical requirements on their objects.

While the invention has been described by way of example and in terms of the preferred embodiments, it should be understood that the invention is not limited to the disclosed embodiments. On the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A control chip coupled to a sensing circuit, comprising:
a first memory comprising:
a first storage area configured to store sensing data provided by the sensing circuit; and
a second storage area configured to store a plurality of first processing parameters;
an accessing circuit reading continuous data stored in the first storage area according to a first access command to generate first read data and reading at least one first processing parameter stored in the second storage area according to a second access command to generate second read data;
a second memory storing the first read data and the second read data; and
a processing circuit reading the second memory and processing the first read data according to the second read data to generate first processed data,
wherein:
the processing circuit stores the first processed data in the second memory,
the sensing data comprises a plurality of row data,
the accessing circuit reads first row data of the plurality of row data to provide the first read data,
the accessing circuit accesses the second memory to capture the first processed data and writes the first processed data to the first memory,
after writing the first processed data to the first memory, the accessing circuit reads second row data of the plurality of row data to provide third read data and stores the third read data to the second memory, the processing circuit processes the third read data stored in the second memory according to the second read data to generate second processed data.

2. The control chip as claimed in claim 1, wherein the accessing circuit writes the first processed data to the first storage area.

3. The control chip as claimed in claim 2, wherein a portion of the sensing data is replaced by the first processed data.

4. The control chip as claimed in claim 1, wherein the accessing circuit writes the first processed data to a third storage area of the first memory, and the third storage area is different from the first storage area.

5. The control chip as claimed in claim 1, wherein the processing circuit adjusts the second read data stored in the second memory.

6. The control chip as claimed in claim 1, wherein the first memory is a volatile memory, and the second memory is a static random-access memory.

7. The control chip as claimed in claim 1, further comprising:
 an input-output interface configured to receive at least one second processing parameter and to transmit the second processing parameter to the second memory.

8. The control chip as claimed in claim 7, wherein:
 the processing circuit reads the second memory and processes the first read data according to the second processing parameter to generate third processed data, and the processing circuit stores the third processed data to the second memory,
 the accessing circuit accesses the second memory to capture the third processed data and writes the third processed data to the first memory.

9. An evaluation board comprising:
 a sensing circuit sensing an environmental feature to generate sensing data;
 a first memory comprising:
 a first storage area configured to store the sensing data; and
 a second storage area configured to store a plurality of first processing parameters;
 an accessing circuit reading continuous data stored in the first storage area according to a first access command to generate first read data and reading at least one first processing parameter stored in the second storage area according to a second access command to generate second read data;
 a second memory storing the first read data and the second read data; and
 a processing circuit reading the second memory and processing the first read data according to the second read data to generate first processed data,
 wherein:
 the processing circuit stores the first processed data to the second memory,
 the sensing data comprises a plurality of row data,
 the accessing circuit reads first row data of the plurality of row data to provide the first read data,
 the accessing circuit accesses the second memory to capture the first processed data and writes the first processed data to the first memory,
 after writing the first processed data to the first memory, the accessing circuit reads second row data of the plurality of row data to provide third read data and stores the third read data to the second memory,
 the processing circuit processes the third read data stored in the second memory according to the second read data to generate second processed data.

10. The evaluation board as claimed in claim 9, wherein the sensing circuit is an image sensor.

11. The evaluation board as claimed in claim 10, further comprising:
 a capture interface writing the sensing data to the first storage area.

12. The evaluation board as claimed in claim 9, wherein the accessing circuit writes the first processed data to the first storage area.

13. The evaluation board as claimed in claim 12, wherein a portion of the sensing data is replaced by the first processed data.

14. The evaluation board as claimed in claim 9, wherein the accessing circuit writes the first processed data to a third storage area of the first memory, and the third storage area is different from the first storage area.

15. The evaluation board as claimed in claim 9, wherein the processing circuit adjusts the second access data stored in the second memory.

16. The evaluation board as claimed in claim 9, wherein the first memory is a volatile memory, and the second memory is a static random-access memory.

17. The evaluation board as claimed in claim 9, further comprising:
 an input-output interface configured to receive at least one second processing parameter and to write the second processing parameter to the second memory.

18. The evaluation board as claimed in claim 17, wherein:
 the processing circuit reads the second memory and processes the first read data according to the second processing parameter to generate third processed data,
 the processing circuit writes the third processed data to the second memory,
 the accessing circuit accesses the second memory to capture the third processed data and writes the third processed data to the first memory.

19. The control chip as claimed in claim 4, wherein the processing circuit performs a sharpness processing, an image enhancement processing, a compression processing, or a data format conversion processing for the first read data and the third read data according to the second read data.

20. The control chip as claimed in claim 19, wherein the first memory is a HyperRAM.

* * * * *